US012214641B2

(12) United States Patent
Franczyk et al.

(10) Patent No.: US 12,214,641 B2
(45) Date of Patent: Feb. 4, 2025

(54) VARIABLE STIFFNESS HYDRAULIC DAMPER

(71) Applicant: BeijingWest Industries Co., Ltd., Beijing (CN)

(72) Inventors: Bartlomiej Franczyk, Cracow (PL); Pawel Slusarczyk, Myslenice (PL)

(73) Assignee: BeijingWest Industries Co., Ltd., Beijing (CN)

( * ) Notice: Subject to any disclaimer, the term of this patent is extended or adjusted under 35 U.S.C. 154(b) by 380 days.

(21) Appl. No.: 17/863,381

(22) Filed: Jul. 12, 2022

(65) Prior Publication Data

US 2023/0120334 A1    Apr. 20, 2023

(30) Foreign Application Priority Data

Oct. 20, 2021    (CN) .................... 202111219157.X

(51) Int. Cl.
*F16F 9/34* (2006.01)
*B60G 13/08* (2006.01)
(Continued)

(52) U.S. Cl.
CPC ............ *B60G 17/08* (2013.01); *B60G 13/08* (2013.01); *F16F 9/185* (2013.01); *F16F 9/3214* (2013.01);
(Continued)

(58) Field of Classification Search
CPC .. F16F 9/185; F16F 9/19; F16F 9/3214; F16F 9/512; F16F 9/46; F16F 9/463;
(Continued)

(56) References Cited

U.S. PATENT DOCUMENTS

| 4,723,640 A | 2/1988 | Beck |
| 4,821,851 A | 4/1989 | Kruckemeier et al. |

(Continued)

FOREIGN PATENT DOCUMENTS

| DE | 4002883 A1 | 8/1991 |
| DE | 102012016711 A1 | 2/2014 |

(Continued)

OTHER PUBLICATIONS

The Second Office Action issued on Apr. 17, 2023 for counterpart European patent application No. 21170190.9.

*Primary Examiner* — Nicholas J Lane
(74) *Attorney, Agent, or Firm* — Dickinson Wright PLLC

(57) ABSTRACT

The present invention relates to a hydraulic damper, comprising a tube, a piston assembly comprising compression and rebound valve assemblies, and a controllable solenoid valve. The piston assembly further comprises a housing; first, second and third partition members; first, second, third and fourth check valves; and one or more radial channels; wherein said first partition member has a first axial opening and the solenoid valve has a valve member provided with at least one inlet in fluid communication with said first axial opening, and one or more outlets in fluid communication with said first internal chamber, wherein said second partition member has a second axial opening; wherein said first axial opening and said second axial opening allow the working liquid to flow from said third internal chamber to said at least one inlet of the solenoid valve bypassing said second internal chamber.

12 Claims, 4 Drawing Sheets

(51) Int. Cl.
*B60G 17/08* (2006.01)
*F16F 9/18* (2006.01)
*F16F 9/32* (2006.01)
*F16F 9/512* (2006.01)
*F16F 9/19* (2006.01)

(52) U.S. Cl.
CPC ......... *F16F 9/512* (2013.01); *B60G 2202/24* (2013.01); *B60G 2204/62* (2013.01); *B60G 2206/41* (2013.01); *B60G 2500/104* (2013.01); *B60G 2500/11* (2013.01); *B60G 2800/162* (2013.01); *F16F 9/19* (2013.01); *F16F 2222/12* (2013.01); *F16F 2228/066* (2013.01); *F16F 2232/08* (2013.01); *F16F 2234/02* (2013.01)

(58) Field of Classification Search
CPC ..... F16F 9/469; B60G 13/08; B60G 2202/24; B60G 2204/62; B60G 2206/41
See application file for complete search history.

(56) References Cited

U.S. PATENT DOCUMENTS

| | | | |
|---|---|---|---|
| 4,997,068 A | | 3/1991 | Ashiba |
| 5,205,385 A | * | 4/1993 | Ashiba ..................... F16F 9/46 188/266.5 |
| 5,699,885 A | | 12/1997 | Forster |
| 6,202,805 B1 | | 3/2001 | Okada et al. |
| 10,746,247 B2 | | 8/2020 | Slusarczyk et al. |
| 2004/0188200 A1 | | 9/2004 | Katayama et al. |
| 2012/0145496 A1 | | 6/2012 | Goetz et al. |
| 2016/0201753 A1 | * | 7/2016 | Nakano .................. F16F 9/468 188/266.3 |
| 2017/0058987 A1 | | 3/2017 | Nakano |
| 2018/0038441 A1 | | 2/2018 | Smeljanskij |
| 2018/0112736 A1 | | 4/2018 | Luedecke et al. |
| 2018/0142756 A1 | * | 5/2018 | Knapczyk ............... F16F 9/348 |
| 2019/0128360 A1 | * | 5/2019 | Sakuta .................. F16F 9/3481 |
| 2019/0271371 A1 | * | 9/2019 | Slusarczyk ........... F16F 9/3228 |
| 2021/0010558 A1 | * | 1/2021 | Kato ........................ F16F 9/19 |
| 2022/0412429 A1 | * | 12/2022 | Kim ........................ F16F 9/54 |

FOREIGN PATENT DOCUMENTS

| | | |
|---|---|---|
| DE | 102014214654 A1 | 1/2016 |
| EP | 1326030 A2 | 7/2003 |
| JP | 2008089037 A | 4/2017 |
| JP | 2017526875 A | 9/2017 |
| WO | 2014007912 A1 | 1/2014 |

\* cited by examiner

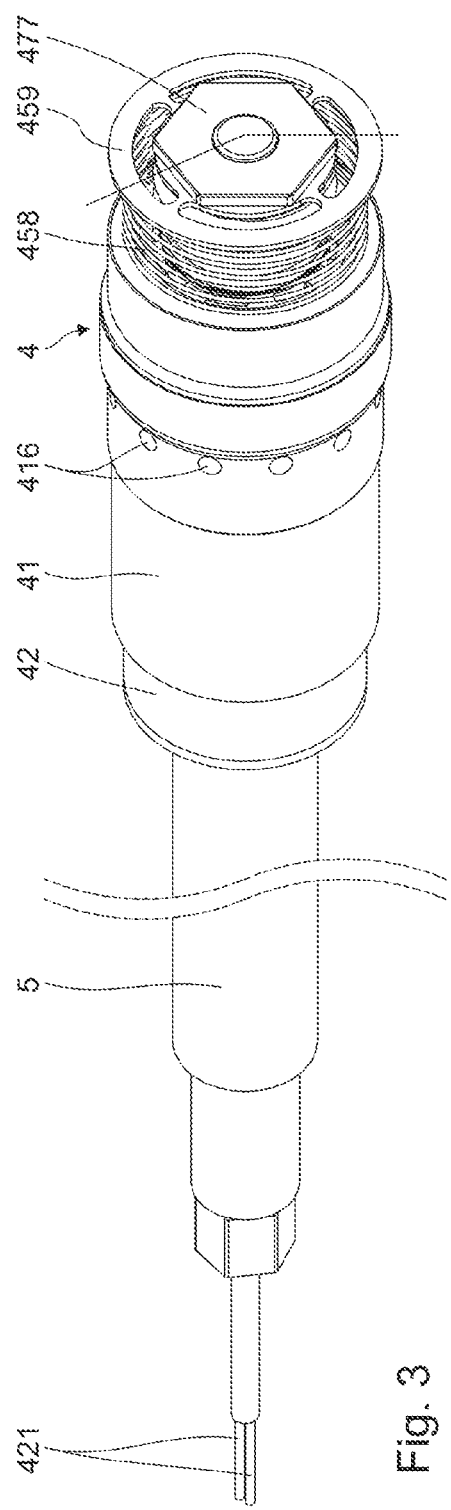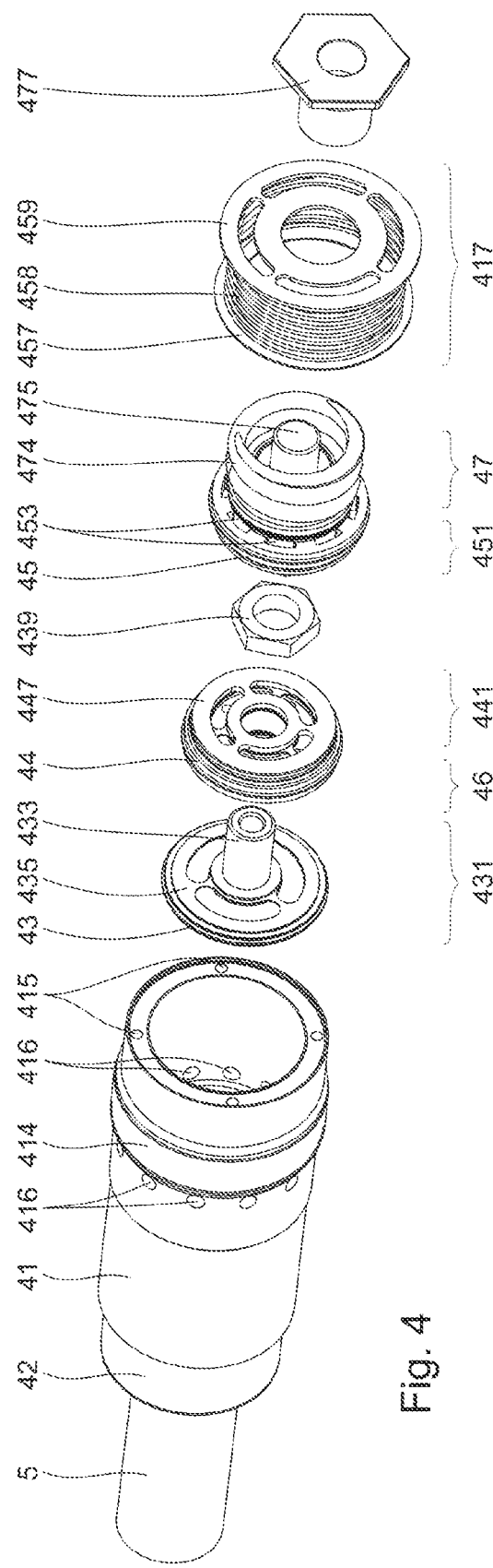

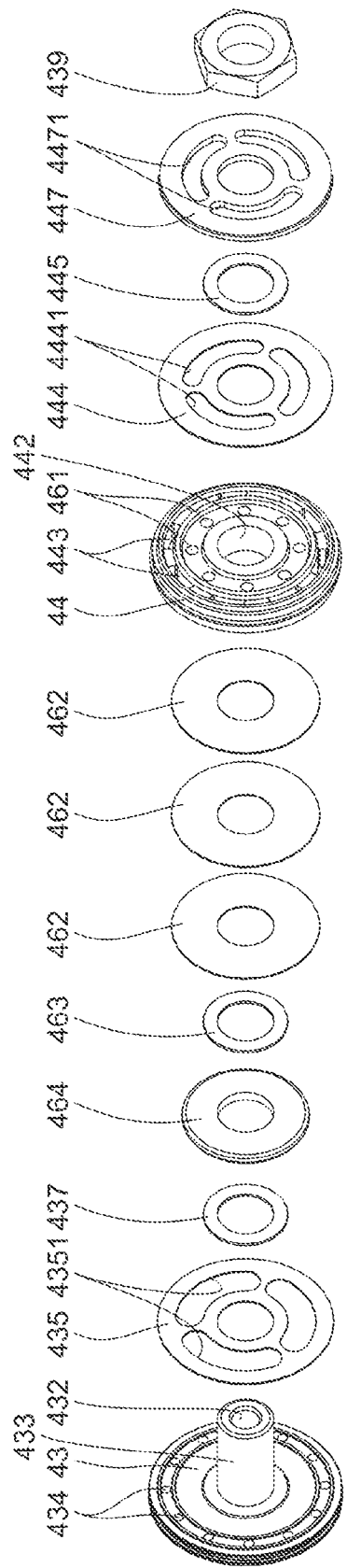
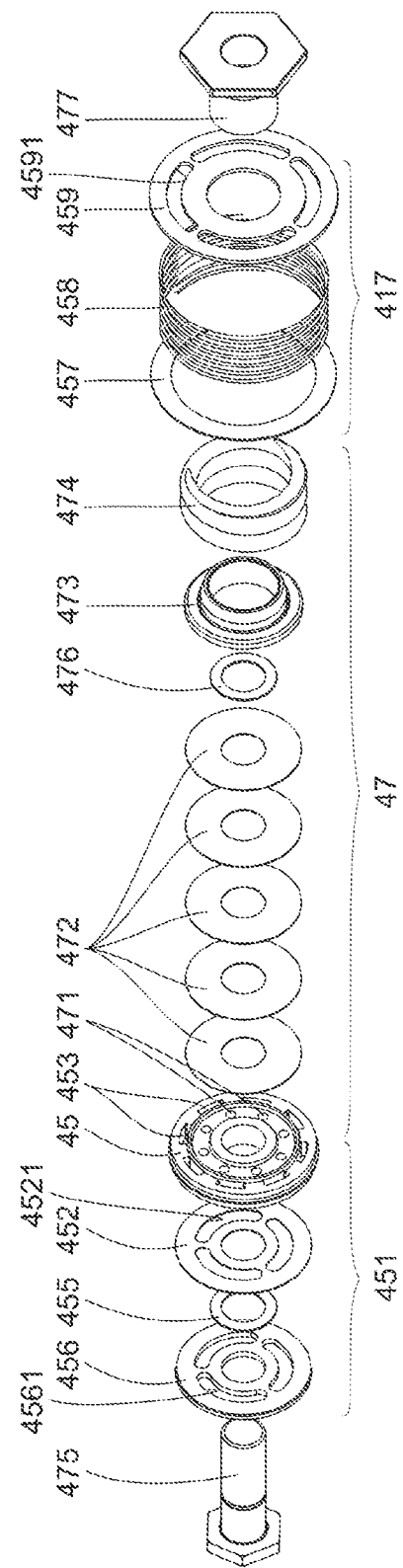
Fig. 5
Fig. 6

VARIABLE STIFFNESS HYDRAULIC DAMPER

CROSS-REFERENCE TO RELATED APPLICATIONS

This application claims priority to Chinese Patent Application No. 202111219157.X, filed on Oct. 20, 2021, which is hereby incorporated by reference in its entirety.

FIELD OF THE INVENTION

The present invention relates to a hydraulic damper, in particular a motor vehicle suspension damper, comprising a tube filed with working liquid, a piston assembly disposed slidably within the tube along an axis, attached to a piston rod extending outside the damper through a sealed piston rod guide, defining a rebound chamber at the side of a piston rod and a compression chamber at the opposite side, and comprising compression and rebound valve assemblies to regulate the flow of the working liquid passing through the piston assembly during rebound and compression stroke of the damper in response to a velocity of the piston assembly, and a controllable solenoid valve to control the flow of the working liquid passing through the piston assembly during rebound and compression stroke of the damper in response to a control signal.

BACKGROUND OF THE INVENTION

A hydraulic damper implementing Continuously Variable Real Time Damping (CVRTD) technology comprises a controllable solenoid valve that can seamlessly control the damping force in response to the control current. Controllable damping force can provide various damper stiffness settings in a range between "comfort mode" (soft) and "sport mode" (firm).

Commonly a solenoid valve is installed as an external valve mounted to a reservoir tube and internally connected to an external damper tube or as an internal valve mounted within piston assembly. External valves are one-way valves with a simple construction, which is advantageous, but their installation requires the use of an additional tube inside the damper and an additional space outside of the damper. Internal valves do not have this drawback but are required to operate differently for the compression and for the rebound stroke of the damper which leads to constructional and control difficulties.

Document US2018142756 discloses a dual mode hydraulic damper with a piston assembly having a hollow housing including a coil and an armature, axially slidable through a plunger guide with a spring biasing the armature to a first position with fluid allowed to flow through the sleeve to bypass the first valve. The armature slides to a second position with fluid not bypassing the first valve in response to the coil being energized by an electrical cable which extends through the piston rod.

Documents DE4002883, US2018112736, and DE102012016711 also disclose hydraulic dampers with electrically controllable valve elements creating additional by-pass paths.

It has been the object of the present invention to provide a CVRTD hydraulic damper with an internal one-way solenoid valve mounted to the piston assembly, which would operate for both strokes of the damper. It has been another object of the present invention to provide a variable stiffness hydraulic damper employing commercially available one-way solenoid valves, which would be cost efficient and simple in manufacture and assembly.

SUMMARY OF THE INVENTION

Therefore, a damper of the kind mentioned in the outset, according to the present invention is characterized in that the piston assembly further comprises a housing with the solenoid valve disposed within said housing at a side thereof proximate to the rebound chamber; a first partition member disposed within said housing and defining a first internal chamber between the solenoid valve and said first partition member; a second partition member disposed within said housing and defining a second internal chamber between said first partition member and said second partition member; a third partition member disposed within said housing and defining a third internal chamber between said second partition member and said third partition member; a first check valve allowing the working liquid to flow through one or more first axial channels in said first partition member from said first internal chamber to said second internal chamber, while blocking fluid flow in an opposite direction; a second check valve allowing the working liquid to flow through one or more second axial channels in said second partition member from said second internal chamber to said third internal chamber, while blocking fluid flow in an opposite direction; a third check valve allowing the working liquid to flow through one or more third axial channels in said third partition member from the compression chamber to said third internal chamber, while blocking fluid flow in an opposite direction; a fourth check valve allowing the working liquid to flow through one or more fourth axial channels disposed within a wall of said housing from said first internal chamber to the compression chamber, while blocking fluid flow in an opposite direction; one or more plurality channels disposed within the wall of said housing, non-intersecting said axial channels of said fourth check valve, and joining the rebound chamber with said second internal chamber; wherein said first partition member has a first axial opening and the solenoid valve is provided with at least one inlet in fluid communication with said first axial opening, and one or more outlets in fluid communication with said first internal chamber, wherein said second partition member has a second axial opening; wherein said first axial opening and said second axial opening allow the working liquid to flow from said third internal chamber to said at least one inlet of the solenoid valve bypassing said second internal chamber.

Preferably said first check valve is disposed within said second internal chamber, and/or said second check valve is disposed within said third internal chamber, and/or said third check valve is disposed within said third internal chamber.

Preferably at least one of said check valves has a form of at least one deflectable or floating disc covering the outlets of said axial channels.

Preferably the compression valve assembly is disposed on a side of said second partition member proximate to the rebound chamber and has a form of at least one deflectable or floating disc covering the outlets of one or more fifth axial channels in said second partition member, which are located radially proximal with respect to said second axial channels of said second check valve.

Preferably the rebound valve assembly is disposed on a side of said third partition member proximate to the compression chamber and has a form of at least one deflectable or floating disc covering the outlets of one or more sixth axial channels in said third partition member, which are located radially proximal with respect to said third axial channels of said third check valve.

Preferably the disc(s) of the compression valve assembly and/or the disc(s) of the rebound valve assembly and/or the disc(s) of said at least one of said check valves are biased by a spring.

Preferably said third internal chamber is common for both compression and rebound strokes of the damper.

Preferably said housing has a form of a sleeve shaped member.

Preferably at least one of said partition members is made integrally with the housing.

Preferably said first partition member comprises an inlet tube defining said first axial opening and said second axial opening is disposed about said inlet tube.

Preferably the solenoid valve has a valve member disposed within said first internal chamber which abuts said first partition member.

Preferably the damper is a twin-tube or a mono-tube damper.

BRIEF DESCRIPTION OF DRAWINGS

The invention shall be described and explained below in connection with the attached drawings in which:

FIG. 3 is a schematic perspective view of a piston assembly of the damper shown in FIG. 2;

FIG. 4 is a schematic perspective and partially exploded view of the piston assembly shown in FIG. 3;

FIG. 5 is a schematic perspective and exploded view of a first and a second partition member of the piston assembly shown in FIG. 3 and FIG. 4;

FIG. 6 is a schematic perspective and exploded view of a third partition member of the piston assembly shown in FIG. 3 and FIG. 4;

DETAILED DESCRIPTION OF PREFERRED EMBODIMENTS

Figure 1:
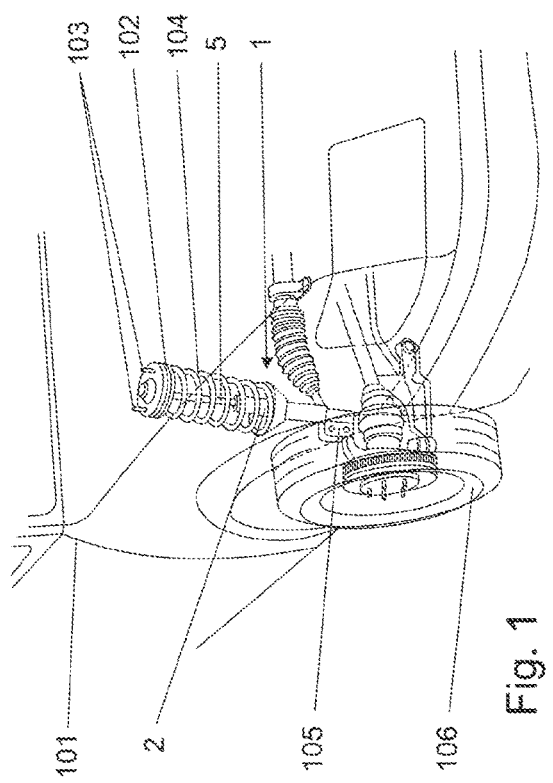
FIG. 1 illustrates a fragment of a vehicle suspension comprising an embodiment of a twin-tube damper according to the present invention.
Figure 2:
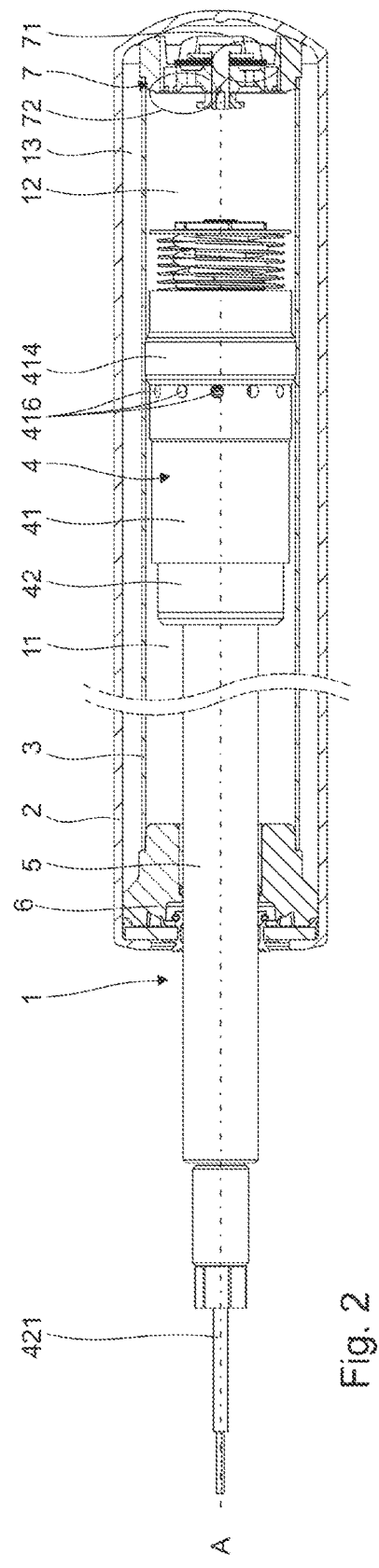
FIG. 2 is a schematic cross-sectional view of the damper shown in FIG. 1.

FIG. 1 schematically illustrates a fragment of an exemplary vehicle suspension comprising a damper 1 of the present invention, which in this embodiment has a twin-tube construction and is attached to a vehicle chassis 101 by means of a top mount 102 and one or more screws 103 disposed on the periphery of the upper surface of the top mount 102. The top mount 102 is connected to a coil spring 104 and a piston rod 5 of the damper 1. An external tube 2 of the damper 1 is connected to the steering knuckle 105 supporting the vehicle wheel 106.

As shown in FIGS. 2-8 the damper 1 comprises a tube 3 filled with viscous working liquid inside of which a movable piston assembly 4 is disposed. The piston assembly 4 is attached to the piston rod 5 extending outside the damper 1 through a sealed piston rod guide 6. The damper 1 is also provided with a base valve assembly 7 fixed at the other end of the tube 3. The piston assembly 4 makes a sliding fit with the inner surface of the tube 3 and divides the tube 3 into a rebound chamber 11 (between the piston assembly 4 and the piston rod guide 6) and a compression chamber 12 (between the piston assembly 4 and the base valve assembly 7). An additional compensation chamber 13 is located at the other side of the base valve assembly 7 between the tube 3 and the external tube 2.

The piston assembly 4 is provided with compression 46 and rebound 47 valve assemblies to control the flow of the working liquid passing between the rebound chamber 11 and the compression chamber 12 while the piston assembly 4 is in motion along an axis A. Also, the base valve assembly 7 is provided with compression 71 and rebound 72 valve assemblies to control the flow of the working liquid passing between the additional compensation chamber 13 and the compression chamber 12, respectively, during rebound and compression stroke of the damper 1. As it is well known to those skilled in the art, the valve assemblies 46, 47 and 71, 72 provide design parameters that may be used to shape desired damping characteristics of the twin-tube damper 1 in response to the velocity of the piston assembly 4.

The term "compression" as used herein with reference to particular elements of the damper refers to these elements or parts of elements that are adjacent to or face the compression chamber 12 or, in a case of the working liquid flow direction, it refers to this flow direction that takes place during the compression stroke of the damper 1. Similarly, the term "rebound" as used in this specification with reference to particular elements of the damper refers to these elements or these parts of particular elements that are adjacent to or face the rebound chamber 11 or, in a case of the working liquid flow direction, it refers to this flow direction that takes place during the rebound stroke of the damper 1.

The piston assembly 4 comprises a housing 41 in a form of a sleeve shaped member provided with Teflon annular sealing 414 for sealing the piston assembly 4 with the tube 3. A first partition member 43 is inserted from the rebound end of the housing 41 and rests on its annular retaining surface. A cylindrical one-way solenoid valve 42 is screwed into the housing sleeve 41 from the rebound end thereof. The solenoid valve 42 is provided at the compression end thereof with a cylindrical valve member 422 (cf. FIG. 7, 8) having at this axial position diameter lower that the internal diameter of the housing 41 and provided with an axial inlet 423 and one or more radial, equiangularly spaced, outlets 424. In this embodiment the solenoid valve 42 is the active damping valve produced by KENDRION (NL). The valve member 422 of the solenoid valve 42 abuts the first partition member 43 and fixes its position. The solenoid valve 42 is in turn screwed into the piston rod 5 and controllable by an electric control cable 421 passing through the piston rod 5 and extending outside of the damper 1.

The first partition member 43 defines a first internal chamber 411 between the solenoid valve 42 and the first partition member 43 and has a first axial opening 432 in fluid communication with the inlet 423 of the solenoid valve 42. An annular seal 436 between the valve member 422 and the first partition member 43 seals the fluid connection of the inlet 423 with the first axial opening 432. The first internal chamber 411 surrounds the outlets 424 of the valve member 422 of the solenoid valve 42.

A second partition member 44 is disposed within the housing 41 and defines a second internal chamber 412 between the first partition member 43 and the second partition member 44. The second partition member 44 has a second axial opening 442 that along with the first axial opening 432 allow the working liquid to flow from the third internal chamber 413 to the inlet 423 of the solenoid valve 42. In this embodiment, the first partition member 43 has an inlet tube 433 and the second partition member 44 is disposed about the inlet tube 433. Twelve equiangularly spaced radial channels 416 disposed within the wall of the housing 41 join the rebound chamber 11 with the second internal chamber 412.

A third partition member 45 is disposed within the housing 41 and defines a third internal chamber 413 between the second partition member 43 and the third partition member 45.

A first check valve 431 allows the working liquid to flow from the first internal chamber 411 to the second internal chamber 412, while blocking fluid flow in an opposite direction. In this embodiment the first check valve 431 has a form of a deflectable disc 435 covering twelve equiangularly disposed first axial channels 434 in the first partition member 43 at the side of the second internal chamber 412. The deflectable disc 435 is provided with three kidney shaped openings 4351 over its circumference to decrease its stiffness.

A second check valve 441 allows the working liquid to flow from the second internal chamber 412 to the third internal chamber 413, while blocking fluid flow in an opposite direction. In this embodiment the second check valve 441 has a form of a deflectable disc 444 covering eight (8) second axial channels 443 in the second partition member 44 located radially distal at the side of the third internal chamber 413.

A third check valve 451 allows the working liquid to flow from the compression chamber 12 to the third internal chamber 413, while blocking fluid flow in an opposite direction. In this embodiment the third check valve 451 has a form of a deflectable disc 452 covering eight (8) third axial channels 453 in the third partition member 45 located radially distal at the side of the third internal chamber 413.

In this embodiment the compression valve assembly 46 of the piston assembly 4 is disposed in the second internal chamber 412, on the rebound side of the second partition member 44, and has a form of three deflectable discs 462 adjoining each other and covering eight (8) fifth axial channels 461 in the second partition member 44 located radially proximal. A distancing disc 463 adjoins the innermost deflectable disc 462 and a retaining disc 464 adjoins the distancing disc 463 defining maximum deflection of the stack of discs 462.

The deflectable disc 435 of the first check valve 431, a distancing disc 437, the retaining disc 464, the distancing disc 463, the discs 462 of the compression valve assembly 46, the second partition member 44, the deflectable disc 444 of the second check valve 441, a distancing disc 445, and a retaining disc 447 are disposed in this order over the inlet tube 433 of the first partition member 43 and secured with a securing nut 439 screwed on an external thread provided at the end of the inlet tube 433. The deflectable disc 444 and the retaining disc 447 are provided respectively with kidney shaped openings 4441 and 4471 over its circumference, allowing the working liquid to flow from the third internal chamber 413 to the fifth axial channels 461 of the compression valve assembly 46.

In this embodiment the rebound valve assembly 47 of the piston assembly 4 is disposed in the compression chamber 12, on the compression side of the third partition member 45, and has a form of five deflectable discs 472 adjoining each other and covering eight (8) sixth axial channels 471 in the third partition member 45 located radially proximal. The stack of discs 472 is additionally biased by a coil spring 474 disposed between a spring seat 473 and a retaining disc 459. The deflectable disc 452 of the third check valve 451 and the retaining disc 456 are provided respectively with kidney shaped openings 4521 and 4561 over its circumference, allowing the working liquid to flow from the third internal chamber 413 to the sixth axial channels 471 of the rebound valve assembly 47.

A fourth check valve 417 allows the working liquid to flow from the first internal chamber 411 to the compression chamber 12, while blocking fluid flow in an opposite direction. In this embodiment the fourth check valve 417 has a form of a floating disc 457 covering the outlets of four (4) fourth axial channels 415 disposed equiangularly within the wall of the housing 41, non-intersecting with the radial channels 416, and joining the compression chamber 12 with the first internal chamber 411. The floating disc 457 is biased by a coil spring 458 disposed between the floating disc 457 and the retaining disc 459. The retaining disc 459 is provided with four kidney shaped openings 4591 over its circumference, allowing the working liquid to flow therebetween.

The retaining disc 456, a distancing disc 455, the deflectable disc 452, the third partition member 45, deflectable discs 472, a washer 476, the spring seat 473, the spring 474, the floating disc 457, the spring 458, and the retaining disc 459 are disposed in this order over a fixing bolt 475 passing through the third partition member 45 and secured with a securing nut 477 screwed on an external thread provided at the end of the fixing bolt 475. The third partition member 45 assembled in this way is screwed in the housing 41 provided with an internal thread at the compression end thereof.

The first 43, second 44 and third 45 partition members are sealed with the internal wall of the housing 41 respectively by means of O-ring seals 438, 446, and 454.

The functionality of a piston assembly according to the present invention shall be explained with reference to FIG. 7 and FIG. 8.

Figure 7:
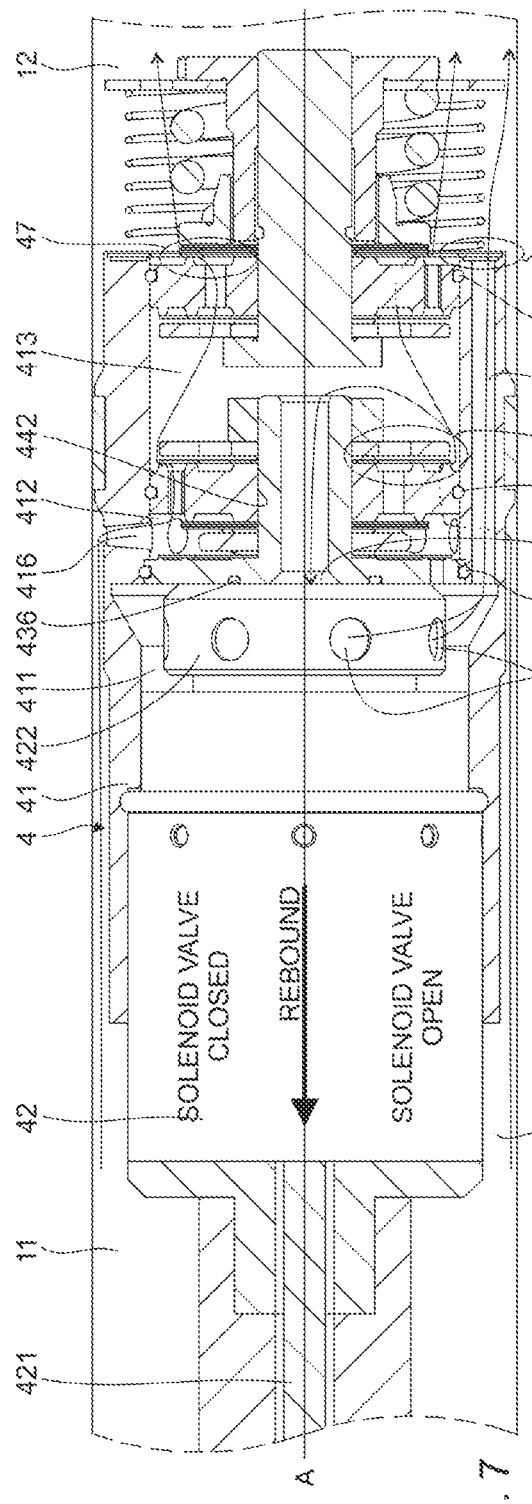
FIG. 7 illustrates functionality of a piston assembly of a damper according to the present invention during rebound stroke of the damper with the solenoid valve closed (top part of the drawing) and open (bottom part of the drawing)

As shown in top part of FIG. 7, during the rebound stoke of the damper 1, and when the solenoid valve 42 is closed, the working liquid flows from the rebound chamber 11 to the second internal chamber 412 through the radial channels 416, then to the third internal chamber 413 through the second check valve 441, and finally through the rebound valve assembly 47 to the compression chamber 12.

As shown in bottom part of FIG. 7, during the rebound stoke of the damper 1, and when the solenoid valve 42 is at least partially open, the working liquid flows not only as shown in the top part of FIG. 7 but also through an additional flow channel. This additional flow channel begins in the third internal chamber 413 and follows through the second axial opening 442 in the second partition member 44 and the first axial opening 432 in the first partition member 43 to the inlet 423 of the solenoid valve 42. From outlets 424 of the solenoid valve 42 the working liquid flows to the first internal chamber 411, from which it flows out of the housing 41 to the compression chamber 12 through fourth axial channels 415 and the fourth check valve 417. Therefore flow restrictions generated by the piston assembly can be decreased in dependence of the opening level of the solenoid valve 42.

Figure 8:
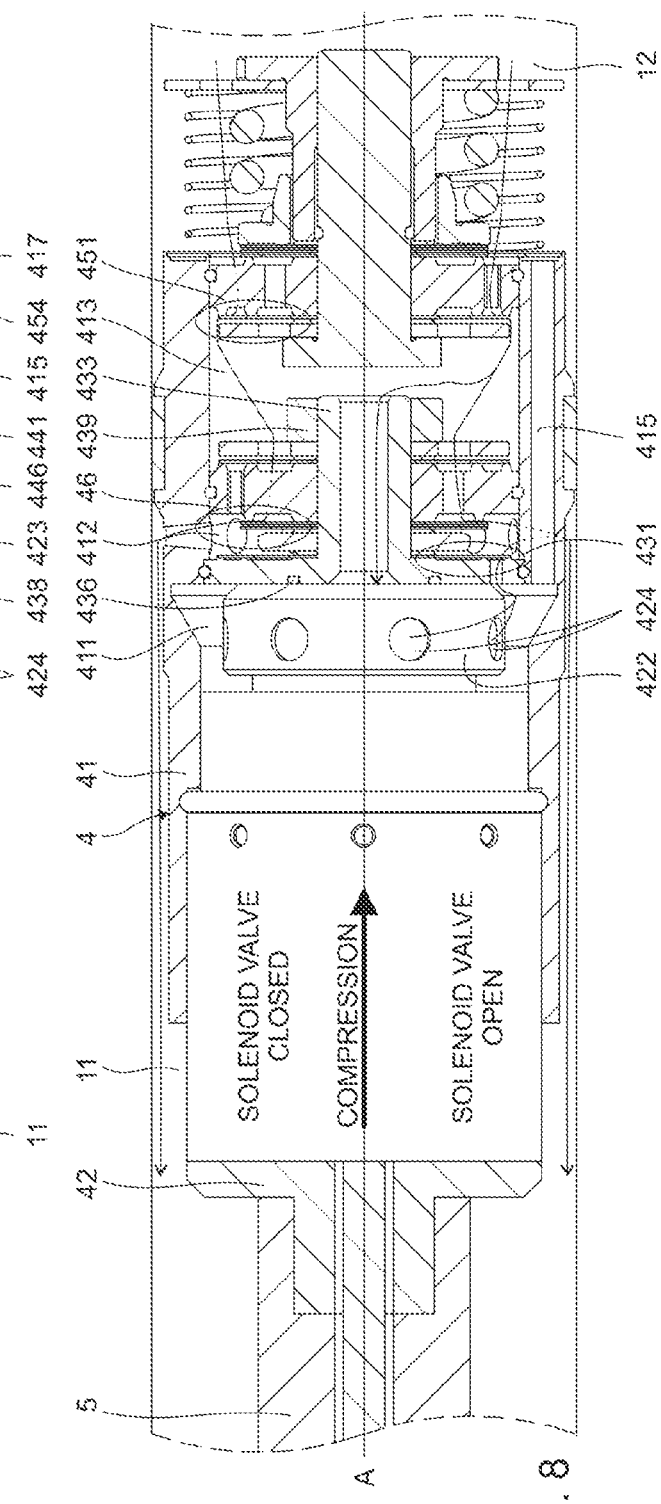
FIG. 8 illustrates functionality of a piston assembly of a damper according to the present invention during compression stroke of the damper with the solenoid valve closed (top part of the drawing) and open (bottom part of the drawing).

As shown in top part of FIG. 8, during the compression stroke of the damper 1, and when the solenoid valve 42 is closed, the working liquid flows from the compression chamber 12 to the third internal chamber 413 through the third check valve 451, then to the second internal chamber 412 through the compression valve assembly 46, and finally through the radial channels 416 to the rebound chamber 11.

As shown in the bottom part of FIG. 8, during the compression stroke of the damper 1, and when the solenoid valve 42 is at least partially open, the working liquid flows not only as shown in the top part of FIG. 8 but also through an additional flow channel. This additional flow channel also begins in the third internal chamber 413 and follows through the second axial opening 442 in the second partition member 44 and the first axial opening 432 in the first partition member 43 to the inlet 423 of the solenoid valve 42. From outlets 424 of the solenoid valve 42, the working liquid flows to the first internal chamber 411. From the first internal chamber 411, the working liquid flows to the second internal chamber 412 through the first check valve 431, and finally through the radial channels 416 to the rebound chamber 11.

The above embodiment of the present invention is merely exemplary. The figures are not necessarily to scale, and some features may be exaggerated or minimized. These and other factors however should not be considered as limiting the spirit of the invention, the intended scope of protection of which is indicated in appended claims.

LIST OF REFERENCE NUMERALS 1. damper
    11. rebound chamber
    12. compression chamber
    13. compensation chamber
2. external tube
3. tube
4. piston assembly
    41. housing
        411. first internal chamber
        412. second internal chamber
        413. third internal chamber
        414. annular sealing
        415. fourth axial channels
        416. radial channel
        417. fourth check valve
    42. solenoid valve
        421. electric control cable
        422. valve member
        423. inlet
        424. outlet
    43. first partition member
        431. first check valve
        432. first axial opening
        433. inlet tube
        434. first axial channels
        435. deflectable disc
            4351. kidney shaped opening
        436. annular seal
        437. distancing disc
        438. O-ring seal
        439. securing nut
    44. second partition member
        441. second check valve
        442. second axial opening
        443. second axial channels
        444. deflectable disc
            4441. kidney shaped opening
        445. distancing disc
        446. O-ring seal
        447. retaining disc
            4471. kidney shaped opening
    45. third partition member
        451. third check valve
        452. deflectable disc
            4521. kidney shaped opening
        453. third axial channels
        454. O-ring seal
        455. distancing disc
        456. retaining disc
            4561. kidney shaped opening
        457. floating disc
        458. spring
        459. retaining disc
            4591. kidney shaped opening
    46. compression valve assembly
        461. fifth axial channels
        462. deflectable disc
        463. distancing disc
        464. retaining disc
    47. rebound valve assembly
        471. sixth axial channels
        472. floating disc
        473. spring seat
        474. spring
        475. fixing bolt
        476. washer
        477. securing nut
5. piston rod
6. piston rod guide
7. base valve assembly
    71. compression valve assembly
    72. rebound valve assembly
101. vehicle chassis
102. top mount
103. screw
104. spring
105. steering knuckle
106. vehicle wheel

The invention claimed is:

1. A hydraulic damper (1), in particular a motor vehicle suspension damper, comprising:
a tube (3) filed with working liquid;
a piston assembly (4) disposed slidably within the tube (3) along an axis (A), attached to a piston rod (5) extending outside the hydraulic damper (1) through a sealed piston rod guide (6), defining a rebound chamber (11) adjacent the piston rod (5) and a compression chamber (12) at the opposite side, and including a compression valve assembly (46) and a rebound valve assembly (47) to regulate a flow of the working liquid through the piston assembly (4) during rebound and compression strokes of the hydraulic damper (1) in response to a velocity of the piston assembly (4); and
a controllable solenoid valve (42) configured to control the flow of the working liquid passing through the piston assembly (4) during the rebound and compression strokes of the hydraulic damper (1) in response to a control signal,
wherein the piston assembly (4) further comprises:
a housing (41) with the controllable solenoid valve (42) disposed within said housing (41) at a side thereof proximate to the rebound chamber (11);
a first partition member (43) disposed within said housing (41) and defining a first internal chamber (411) between the controllable solenoid valve (42) and said first partition member (43);
a second partition member (44) disposed within said housing (41) and defining a second internal chamber (412) between said first partition member (43) and said second partition member (44);

a third partition member (45) disposed within said housing (41) and defining a third internal chamber (413) between said second partition member (43) and said third partition member (45);

a first check valve (431) allowing the working liquid to flow through one or more first axial channels (434) in said first partition member (43) from said first internal chamber (411) to said second internal chamber (412), while blocking fluid flow in an opposite direction;

a second check valve (441) allowing the working liquid to flow through one or more second axial channels (443) in said second partition member (44) from said second internal chamber (412) to said third internal chamber (413), while blocking fluid flow in an opposite direction;

a third check valve (451) allowing the working liquid to flow through one or more third axial channels (453) in said third partition member (45) from the compression chamber (12) to said third internal chamber (413), while blocking fluid flow in an opposite direction;

a fourth check valve (417) allowing the working liquid to flow through one or more fourth axial channels (415) disposed within a wall of said housing (41) from said first internal chamber (411) to the compression chamber (12), while blocking fluid flow in an opposite direction; and one or more radial channels (416) disposed within the wall of said housing (41), non-intersecting said fourth axial channels (415) of said fourth check valve (417), and joining the rebound chamber (11) with said second internal chamber (412), wherein said first partition member (43) has a first axial opening (432) and the controllable solenoid valve (42) is provided with at least one inlet (423) in fluid communication with said first axial opening (432), and one or more outlets (424) in fluid communication with said first internal chamber (411), and wherein said second partition member (44) has a second axial opening (442); wherein said first axial opening (432) and said second axial opening (442) allow the working liquid to flow from said third internal chamber (413) to said at least one inlet (423) of the solenoid valve (42) bypassing said second internal chamber (412).

2. The hydraulic damper according to claim 1, wherein said first check valve (431) is disposed within said second internal chamber (412), and/or said second check valve (441) is disposed within said third internal chamber (413), and/or said third check valve (451) is disposed within said third internal chamber (412).

3. The hydraulic damper according to claim 1, wherein at least one of said first check valve (431), said second check valve (441), said third check valve (451) and said fourth check valve (417) has a form of at least one deflectable or floating disc (435, 444, 452, 457) covering the outlets of said axial channels (434, 443, 453, 415).

4. The hydraulic damper according to claim 1, wherein the compression valve assembly (46) is disposed on a side of said second partition member (44) proximate to the rebound chamber (11) and has a form of at least one deflectable or floating disc (462) covering outlets of one or more fifth axial channels (461) in said second partition member (44), which are located radially proximal with respect to said second axial channels (443) of said second check valve (441).

5. The hydraulic damper according to claim 1, wherein the rebound valve assembly (47) is disposed on a side of said third partition member (45) proximate to the compression chamber (12) and has a form of at least one deflectable or floating disc (472) covering outlets of one or more sixth axial channels (471) in said third partition member (45), which are located radially proximal with respect to said third axial channels (453) of said third check valve (451).

6. The hydraulic damper according to claim 3, wherein the disc(s) of the compression valve assembly (46) and/or the disc(s) (472) of the rebound valve assembly (47) and/or the disc(s) (457) of said at least one of said check valves (417) are biased by a spring (474, 458).

7. The hydraulic damper according to claim 1, wherein said third internal chamber (413) is common for both compression and rebound strokes of the hydraulic damper (1).

8. The hydraulic damper according to claim 1, wherein said housing (41) has a form of a sleeve shaped member.

9. The hydraulic damper according to claim 1, wherein at least one of said first partition member (43), said second partition member (44) and said third partition member (45) is made integrally with the housing (41).

10. The hydraulic damper according to claim 1, wherein said first partition member (43) comprises an inlet tube (433) defining said first axial opening (432) and said second axial opening (442) is disposed about said inlet tube (433).

11. The hydraulic damper according to claim 1, wherein the controllable solenoid valve (42) has a valve member (422) disposed within said first internal chamber (411) which abuts said first partition member (43).

12. The hydraulic damper according to claim 1, wherein it is a twin-tube or a mono-tube damper.

* * * * *